Sept. 12, 1933.    J. F. CULLIN    1,926,331
ELECTRIC COIL
Filed May 11, 1928    3 Sheets-Sheet 1

INVENTOR
Jasper F. Cullin
BY
Spencer Hardman & Fehr
ATTORNEYS

Sept. 12, 1933.     J. F. CULLIN     1,926,331
ELECTRIC COIL
Filed May 11, 1928     3 Sheets-Sheet 2

INVENTOR
Jasper F. Cullin
BY
Spencer Hardman & Fch
ATTORNEYS

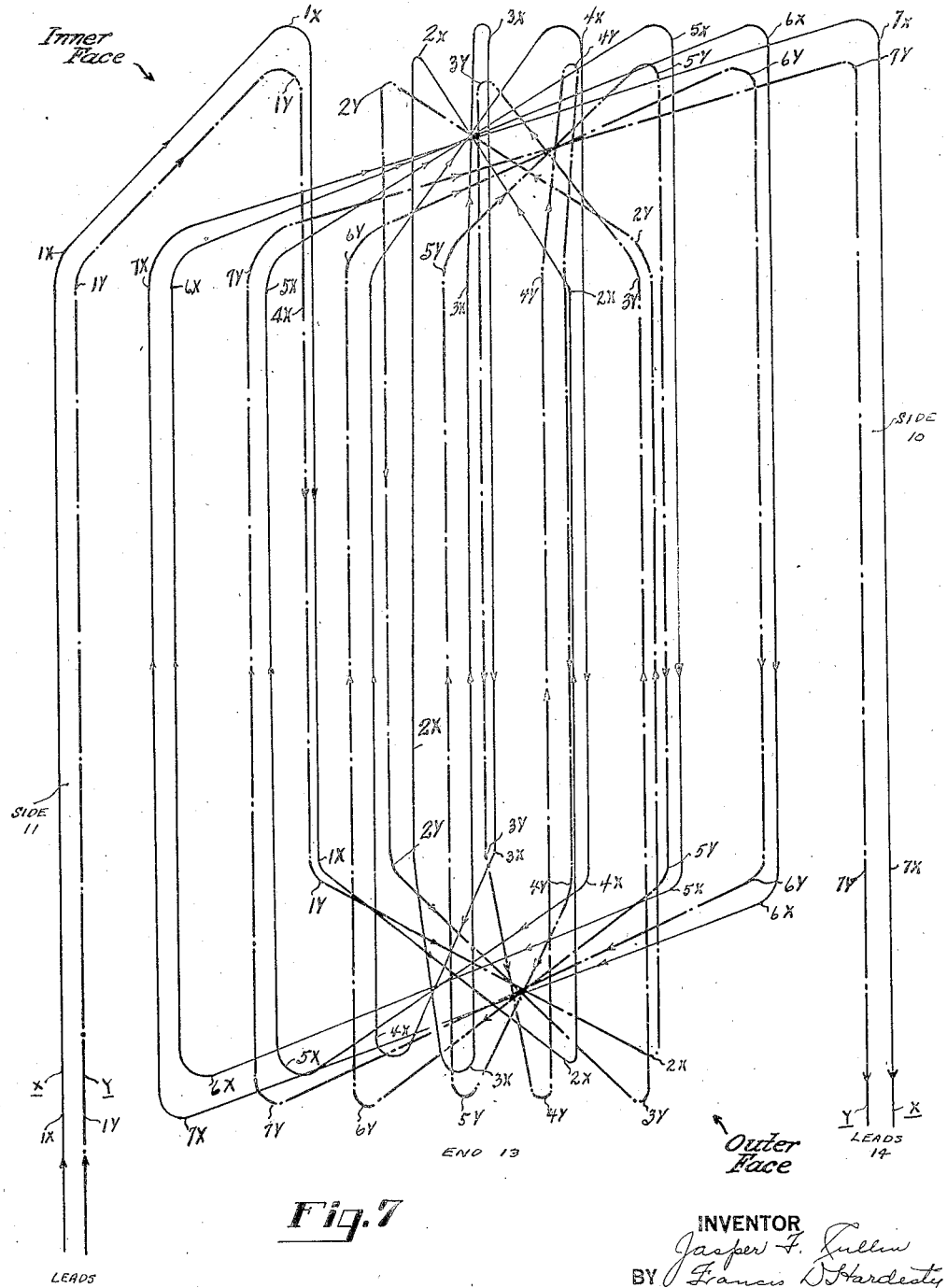

Patented Sept. 12, 1933

1,926,331

UNITED STATES PATENT OFFICE 1,926,331

ELECTRIC COIL

Jasper F. Cullin, Detroit, Mich., assignor, by mesne assignments, to Delco-Remy Corporation, Anderson, Ind., a corporation of Delaware Application May 11, 1928. Serial No. 277,058

13 Claims. (Cl. 171—206)

This invention relates to multiwire, multiturn electric coils particularly adapted for assembling with a slotted armature core.

Among the objects of the present invention are to provide multiwire, multiurn coils so wound that the minimum amount of wire will be required; that when the coils are mounted upon the core, the minimum amount of space will be occupied by the end portions of the coils which portions are adjacent the ends of the core; and that these end portions of the coils will overlap and interfit in a manner such that no strain is placed upon the insulation of the wires of the coils, and so that the operation of pounding down of these end portions to make them fit each other, an operation damaging to the wire insulation, will be eliminated.

These and other objects of the present invention are accomplished by so winding the wires of the coil with the aid of a suitable form that so far as possible, each turn will contain approximately the same amount of wire as its neighbor and the greater portion of the turns will bear the same relation to each other. Therefore, a characteristic of the coil is that as the winding progresses after the first turn, there is a gradual increase in the average distance from one face of the coil to the wires of one coil side of a turn and a gradual increase in the average distance from the opposite face of the coil to the wires of the other coil side of the turn. The greater portion of the coils are also so wound that, if one active side of a coil is located in an inside layer of windings, the other active coil side of the same coil will be located in the outside layer of windings.

This manner of winding is conducive to space and material economy because practically all of the turns are related to each other in a similar manner and the turns are approximately the same in length. Because of this relation the coils made according to the present invention more readily adjust themselves to the armature core with which they are assembled. The wires of the active coil sides adjust themselves to fit the core slots, and the wires of the end portions of the coils adjust themselves to form interfitting arches which cross each other at so slight an angle that there is no appreciable abrading of the wire insulation when the coils are assembled with the core, and the interfitting arches extend the minimum distance from the core ends. Therefore no pounding down of the coil ends is required.

A further object of the invention is to provide a multiwire, multiturn armature coil of the type referred to having its start leads extending from one face, for example the inner face, and its ending leads extending from the outer face. In the finished armature the leads will all extend either from underneath or from above the active coil sides and not from between them. The construction avoids locating these leads between the interfitting arches of the end portions of the coils which location would cause the arches to fit less nicely and would require insulation between the leads and the arches.

Further objects and advantages of the present invention will be apparent from the following description, reference being had to the accompanying drawings wherein a preferred embodiment of one form of the present invention is clearly shown.

In the drawings:

Fig. 7 is an expanded diagrammatical view of the coil.

The drawings disclose a two-wire coil having a plurality of (seven) turns. One wire is striped and the other plain to distinguish them. The striped wire is designated by —X— and its cross section is solid black. The plain wire is designated by —Y— and its cross-sectional view is cross-hatched. The active coil sides 10 and 11 are wrapped, while the end portions 12 and 13 are uncovered. The inside leads 15 project from the inner face and the outside leads 14 from the outer face.

The coil is wound so that cross sections thereof through the active coil sides 10 and 11 are substantially in the form of elongated quadrilaterals and so that the long dimensions of said cross sections are substantially parallel and are inclined to the median plane of the coil.

Figure 4:
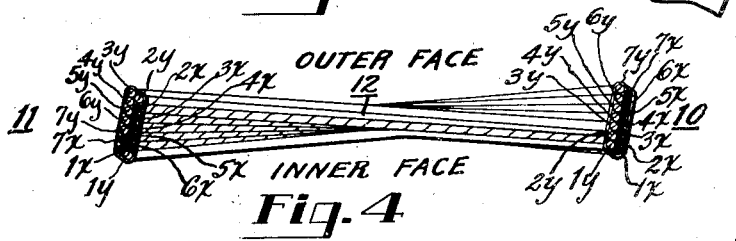
Fig. 4 is a sectional view on line 4—4 of Fig. 1.

The coil is wound upon a suitable machine rotated form in the following manner described with reference to Fig. 4 and Fig. 7.

*First turn.*—The wires pass along side 11 with wire X in the outer layer and nearest the inner face, wire Y being in the inner layer. Along end 12 the wires pass without crossing, and along side 10 wire Y, which is still in the inner layer, is nearest the outer face. Along end 13 the wires meet so that at the start of turn #2 both wires will be in the inner layer.

*Second turn.*—Wires X and Y pass along side 11, both on inside layer with wire Y nearest the outer face. They cross along end 12 so that wire X is in the outside layer along side 10 and is nearest the inner face and Y will be in the inside layer and nearest the outer face. The wires cross and reverse position as they pass along end 13.

*Third turn.*—Wires X and Y pass along side 11, wire X being in the inside layer and nearest the inner face, and wire Y being in the outside layer and nearest the outer face. Along end 12 the wires cross and reverse position so that, as the wires pass along side 10, wire X will be in the outside layer and nearest the inner face and wire Y will be in the inside layer and nearest the outer face. Along end 13 the wires cross and reverse position.

*Fourth turn.*—Wires X and Y pass along side 11, wire X being in the inside layer and nearest the inner face, and wire Y being in the outside layer and nearest the outer face. The wires cross and reverse position as they pass over end 12 and pass along side 10, with wire X in the outside layer and nearest the inner face and wire Y in the inside layer and nearest the outer face. Along end 13 the wires cross and reverse position.

*Fifth turn.*—Wires X and Y pass along side 11, wire X being in the inside layer and nearest the inner face, and wire Y being in the outside layer and nearest the outer face. Along end 12 the wires cross and reverse position and pass along side 10, with wire X in the outside layer and nearest the inner face and wire Y in the inside layer and nearest the outer face. Along end 13 the wires cross and reverse position.

*Sixth turn.*—Wires X and Y pass along side 11, wire X being in the inside layer and nearest the inner face, and wire Y being in the outside layer and nearest the outer face. Along end 12 the wires cross and reverse position and pass along side 10 with wire X in the outside layer and nearest the inner face and wire Y in the inside layer and nearest the outer face. Along end 13 the wires cross and reverse position.

*Seventh turn.*—Wires X and Y pass in the outside layer along side 11 wire X being nearest the inner face. Along end 12 the wires cross and reverse so that wire X is in the outer layer and is nearest the inner face and wire Y is in the inner layer and nearest the outer face.

Figure 1:
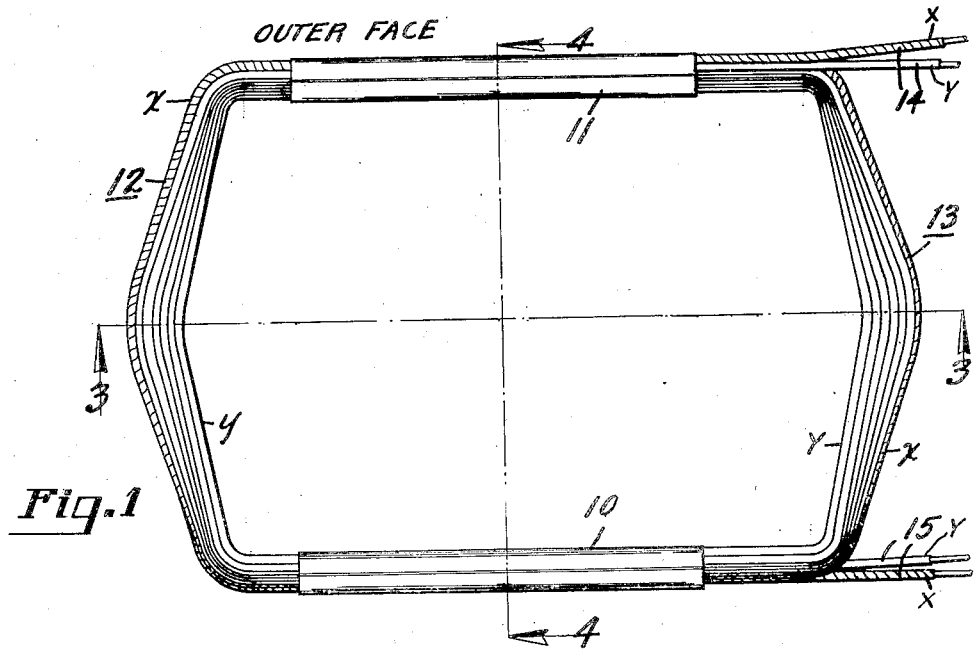
Fig. 1 is a plan view of that face of the coil which is to be nearest the periphery of the armature core, and which face will be hereinafter referred to as the outer face.
Figure 2:
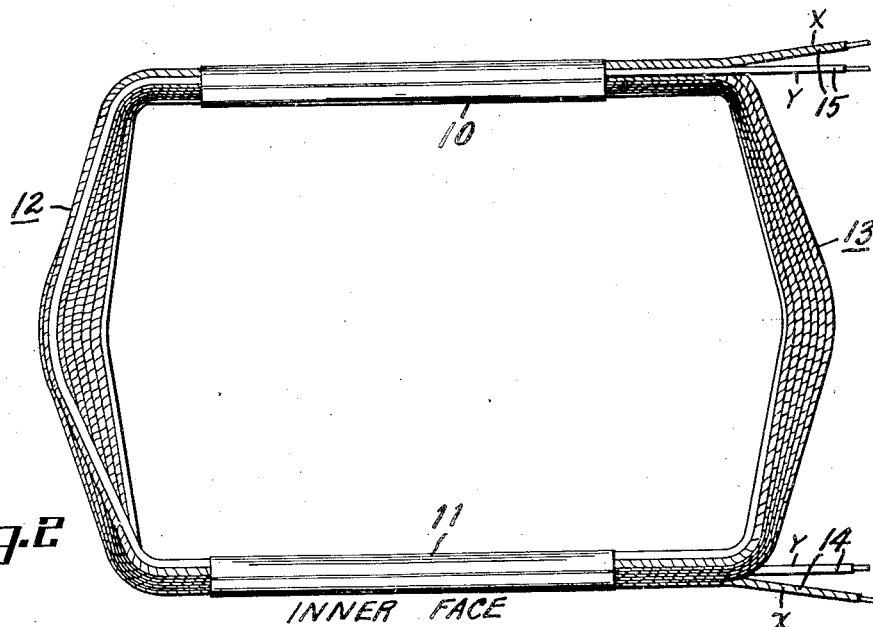
Fig. 2 is a plan view of that face of the coils which is to be nearest the axis of the core, and which face will be hereinafter referred to as the inner face.
Figure 3:
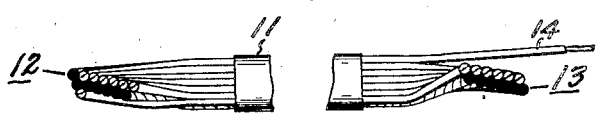
Fig. 3 is a sectional view on line 3—3 of Fig. 1.
Figure 5:
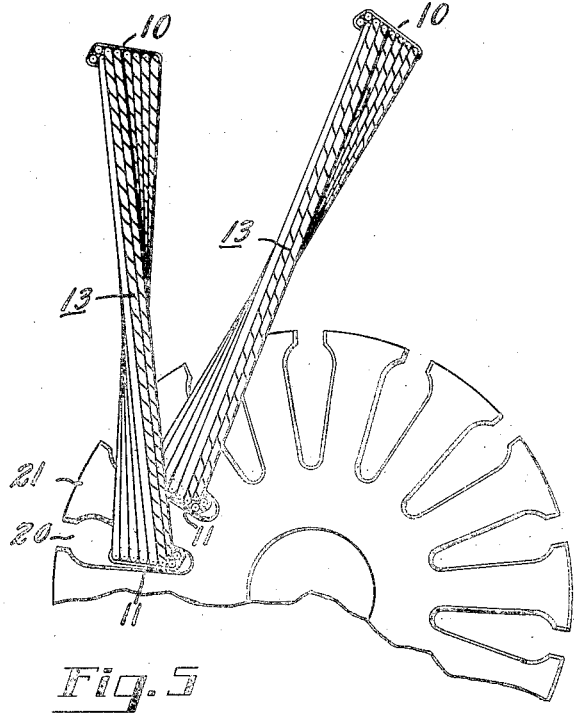
Figs. 5 and 6 are fragmentary end views of a core and show the steps of assembling two coils with the core.

After winding, the active sides of the coils are wrapped with paper so as to retain the shape required for passing the active sides into the core slots. First the active sides 11 of all the coils are entered into the slots 20 of the core 21 as shown in Fig. 5. Then the active coil sides 10 are passed into slots which are spaced by a certain number of core teeth from those slots which contain sides 11 of the respective coils. The act of locating the coil sides 10 for entry into the proper slots 20 while the sides 11 are located in other core slots causes the coil ends 12 and 13 to be bent, each in the form of an arch, as shown for example, at 13a in Fig. 6. Each arched coil end receives another arch and is overlapped by another arch. When each coil side 10 is pressed into a slot upon a previously inserted coil side 11, the paper wrappings of the sides yield so that the wires may accommodate themselves to the shape of the slot and fill the slot nearly completely. The pressing of the coil sides 10 into the slots causes each arched end to fit closely against its neighbor. Just as the wires of the coil sides accommodate themselves to the core slots, the wires of the various coil ends accommodate themselves to each other so that the arches of the ends interfit snugly and no pounding down with a mallet is required. The arches cross each other at so slight an angle that the insulation of the wire is not mashed or displaced appreciably when the coil sides 10 are forced into their respective slots. Therefore no insulating sheets are required to be placed between the overlapping ends of the coils. There is therefore a saving of material (1) because no insulation is required, and (2) wire is saved because the sheet insulation is omitted.

The fact that the wires of the coils accommodate themselves in the manner described to the core slots and to the formation of snugly overlapping arches at the ends of the core is attributed to the fact that the turns of the coils are not wound first in one complete layer and then another complete layer upon the first. With respect to the greater number of turns of the coil, the rule of winding is that along each end portion of the turn the wires cross and reverse position so that if a striped wire (X) is in the inner layer and the plain wire (Y) in the outer layer along one side of the turn, the striped wire (X) will be in the outer layer and the plain wire (Y) will be in the inner layer along the other side of the coil. A further characteristic of the coil is that as the winding progresses after the first turn, there is a gradual increase in the average distance from one face of the coil to the wires of one coil side of a turn and a gradual increase in the average distance from the opposite face of the coil to the wires of the other coil side of the turn. In other words, as the winding progresses, the wires in side 11 gradually recede from the outer face while the wires in side 10 gradually recede from the inner face and approach the outer face.

Since the turns of the coils may accommodate themselves in the manner described the amount of wire required for each coil will be substantially less than in the case of coils wound directly upon the core and less than in the case of conventional preformed coils wound in continuous layers and then shaped before placing upon the core.

It will be observed that the overlapping arched end portions of the coils will bear the same relation to each other. Each arch provides a similar cupped or concave portion to receive its neighbor. There is no building up of thickness of wires at the ends of the core. Hence the space requirements of the armature have been made as small as possible.

Figure 6:
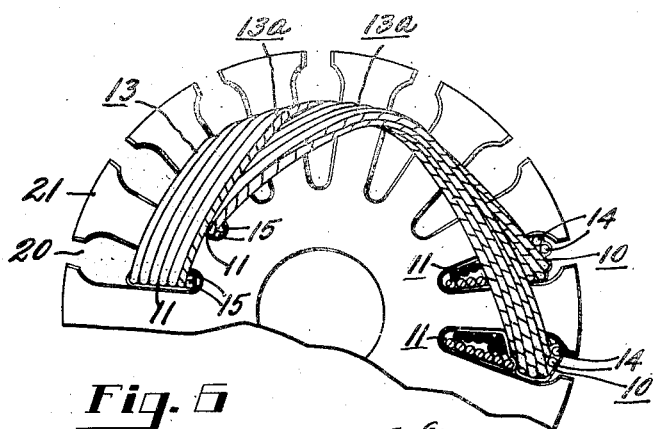

It is important also to note that each pair of starting leads 15 extends from the bottom of a slot and each pair of end leads extends from the top of a slot, and that the start leads extend from one coil side and the end leads from another coil side. Referring to Fig. 6, it will be seen that there is a distinct advantage in bringing out the leads in this manner, for no leads come out from between the two coil sides in any slot; and hence no leads extend between the nested arched ends to interfere with the snug fitting thereof and to cause the insulating of the wires to be mashed and broken.

While the form of embodiment of the present invention as herein disclosed, constitutes a preferred form, it is to be understood that other forms might be adopted, all coming within the scope of the claims which follow.

What is claimed is as follows:

1. An electrical coil for use upon a slotted armature core comprising a plurality of wires wound simultaneously to form a plurality of layers and in a manner such that the cross-section of the active sides is substantially in the form of an elongated quadrilateral, the long dimensions of said sections being substantially parallel, and such that, as the winding progresses, the average distance from one coil face to the wires of one coil side increases and the average distance from the opposite coil face to the wires of the other coil side increases.

2. An electrical coil for use upon a slotted armature core comprising a multi-wire coil so wound that the cross section of the active sides is substantially in the form of an elongated quadrilateral, each coil side having a plurality of layers, and so wound that, with respect to a majority of the turns, one of the wires of one active side of a turn is located in one of the layers and another wire of the same active side of the same turn is located in a different layer and, in the other active side of the same turn, the layer positions of the wires are changed.

3. An electrical coil for use upon a slotted armature core comprising a two-wire coil so wound that the cross section of the active sides is substantially in the form of an elongated quadrilateral, each coil side having two layers, and so wound that, with respect to a majority of the turns, one of the wires of one active side of a turn is located in the inner layer and the other wire of the same active side of the same turn is located in the outer layer, and, in the other active side of the same turn, the layer positions of the wires are reversed.

4. An electrical coil for use upon a slotted armature core comprising a multi-wire coil so wound that the cross section of the active sides is substantially in the form of an elongated quadrilateral, and so wound that, with respect to a majority of the turns, one of the wires of one active side of a turn is located in one of the layers and another wire of the same active side of the same turn is located in a different layer, and, in the other active side of the same turn, the layer positions of the wires are changed, and wound in a manner such that, as the winding progresses, the average distance from one coil face to the wires of one coil side increases and the average distance from the opposite coil face to the wires of the other coil side increases.

5. An electrical coil for use upon a slotted armature core comprising a two-wire coil so wound that the cross section of the active sides is substantially in the form of an elongated quadrilateral, each coil side having two layers, and so wound that, with respect to a majority of the turns, one of the wires of one active side of a turn is located in the inner layer and the other wire of the same active side of the same turn is located in the outer layer, and, in the other active side of the same turn, the layer positions of the wires are reversed, and wound in a manner such that, as the winding progresses, the average distance from one coil face to the wires of one coil side increases and the average distance from the opposite coil face to the wires of the other coil side increases.

6. An electrical coil for use upon a slotted armature core comprising a multi-wire coil so wound that the cross section of the active sides is substantially in the form of an elongated quadrilateral, the long dimensions of said sections being substantially parallel, the coil having leads projecting from the sides thereof at one end of the coil, one of the leads projecting from the inner face of the coil and the other lead projecting from the outer face of the coil.

7. An electrical coil for use upon a slotted armature core comprising a plurality of wires wound simultaneously to form a plurality of layers and in a manner such that the cross-section of the active sides is substantially in the form of an elongated quadrilateral, the long dimensions of said sections being substantially parallel, and such that, as the winding progresses, the average distance from one coil face to the wires of one coil side increases and the average distance from the opposite coil face to the wires of the other coil side increases and so wound that the coil leads project from the sides thereof at one end of the coil, one of the leads projecting from the inner face of the coil and the other lead projecting from the outer face of the coil.

8. An electrical coil for use upon a slotted armature core comprising a multi-wire coil so wound that the cross section of the active sides is substantially in the form of an elongated quadrilateral, each coil side having a plurality of layers, and so wound that, with respect to a majority of the turns, one of the wires of one active side of a turn is located in one of the layers and another wire of the same active side of the same turn is located in a different layer and, in the other active side of the same turn, the layer positions of the wires are changed, and so wound that the leads of the coil project from the sides thereof at one end of the coil, one of the leads projecting from the inner face and the other lead projecting from the outer face.

9. An electrical coil for use upon a slotted armature core comprising a two-wire coil so wound that the cross section of the active sides is substantially in the form of an elongated quadrilateral, each coil side having two layers, and so wound that, with respect to a majority of the turns, one of the wires of one active side of a turn is located in the inner layer and the other wire of the same active side of the same turn is located in the outer layer, and, in the other active side of the same turn, the layer positions of the wires are reversed, and so wound that the leads of the coil project from the sides thereof at one end of the coil, one of the leads projecting from the inner face and the other lead projecting from the outer face.

10. An electrical coil for use upon slotted armature core comprising a multi-wire coil so wound that the cross section of the active sides is substantially in the form of an elongated quadrilateral, and so wound that, with respect to a majority of the turns, one of the wires of one active side of a turn is located in one of the layers and another wire of the same active side of the same turn is located in a different layer, and, in the other active side of the same turn, the layer positions of the wires are changed and wound in a manner such that, as the winding progresses, the average distance from one coil face to the wires of one coil side increases and the average distance from the opposite coil face to the wires of the other coil side increases and so wound that the coil leads project from the sides thereof at one end of the coil, one of the leads projecting from the inner face of the coil and the other lead projecting from the outer face of the coil.

11. An electrical coil for use upon a slotted armature core comprising a two-wire coil so wound that the cross section of the active sides is substantially in the form of an elongated quadrilateral, each coil side having two layers, and so wound that, with respect to a majority of the turns, one of the wires of one active side of a turn is located in the inner layer and the other wire of the same active side of the same turn is located in the outer layer, and, in the other active side of the same turn, the layer positions of the wires are reversed, and wound in a manner such that, as the winding progresses, the average distance from one coil face to the wires of one coil side increases and the average distance from the opposite coil face to the wires of the other coil side increases, and so wound that the coil leads project from the sides thereof at one end of the coil, one of the leads projecting from the inner face of the coil and the other lead projecting from the outer face of the coil.

12. An armature coil adapted to be assembled with others of similar construction upon a slotted armature core and comprising a multi-wire coil which before being assembled with the others is so wound that the cross section of its active coil sides is substantially in the form of an elongated quadrilateral the long dimensions of which are substantially parallel, the coil having leads projecting from the sides thereof at one end of the coil, one of the leads projecting from the inner face of the coil and the other lead from the outer face of the coil, the coil when assembled upon the core providing arched end portions adapted to receive the arched end portions of a neighboring coil.

13. An electrical coil for use upon a slotted armature core comprising a multi-wire coil so wound that the cross section of the active sides is substantially in the form of an elongated quadrilateral, the long dimensions of said sections being inclined to the median plane of the coil and so wound that the coil leads project from the sides thereof at one end of the coil, one of the leads projecting from the inner face of the coil and the other lead projecting from the outer face of the coil.

JASPER F. CULLIN.